(12) United States Patent
Rambhia et al.

(10) Patent No.: US 10,509,829 B2
(45) Date of Patent: Dec. 17, 2019

(54) CONTEXTUAL SEARCH USING NATURAL LANGUAGE

(71) Applicant: Microsoft Technology Licensing, LLC, Redmond, WA (US)

(72) Inventors: Amy Rambhia, Bellevue, WA (US); Harris Syed, Redmond, WA (US); Ed Doran, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 718 days.

(21) Appl. No.: 14/875,143

(22) Filed: Oct. 5, 2015

(65) Prior Publication Data

US 2016/0210363 A1 Jul. 21, 2016

Related U.S. Application Data

(60) Provisional application No. 62/106,186, filed on Jan. 21, 2015.

(51) Int. Cl.
*G06F 16/00* (2019.01)
*G06F 16/951* (2019.01)
(Continued)

(52) U.S. Cl.
CPC .......... *G06F 16/951* (2019.01); *G06F 3/0482* (2013.01); *G06F 3/167* (2013.01);
(Continued)

(58) Field of Classification Search
CPC .......... G06F 17/2705; G06F 17/30867; G06F 17/30528; G06F 17/30663; G06F 3/167;
(Continued)

(56) References Cited

U.S. PATENT DOCUMENTS 6,574,624 B1  6/2003  Johnson et al.
8,370,358 B2  2/2013  Lin et al.
(Continued)

FOREIGN PATENT DOCUMENTS

WO  2013137660 A1  9/2013

OTHER PUBLICATIONS

"Second Written Opinion Issued in PCT Application No. PCT/US2016/013769" dated Dec. 13, 2016, (6 Pages total).
(Continued)

*Primary Examiner* — Merilyn P Nguyen
(74) *Attorney, Agent, or Firm* — NovoTechIP International PLLC

(57) ABSTRACT

A context aware digital assistant supported on devices such as smartphones, tablet computers, wearable computing devices, personal computers (PCs), game consoles, and the like is configured with a natural language interface that enables a user to launch searches for content using contextual references such as time, date, event, location, schedule, activity, contacts, or device. The user can thus use natural language to express the context that is applicable to the sought-after content rather than having to formulate a query that uses a specific syntax. The digital assistant can comprehensively search for the content across applications (i.e., both first and third party applications), devices, and services.

19 Claims, 13 Drawing Sheets

(51) Int. Cl.
*H04L 29/08* (2006.01)
*G10L 15/18* (2013.01)
*G10L 17/22* (2013.01)
*G10L 17/00* (2013.01)
*G06F 3/16* (2006.01)
*G06F 3/0482* (2013.01)
*G06F 17/27* (2006.01)
*G06F 16/248* (2019.01)
*G06F 9/451* (2018.01)
*G06F 16/9537* (2019.01)

(52) U.S. Cl.
CPC ............ *G06F 9/453* (2018.02); *G06F 16/248* (2019.01); *G06F 16/9537* (2019.01); *G06F 17/2705* (2013.01); *G10L 15/1822* (2013.01); *G10L 17/005* (2013.01); *G10L 17/22* (2013.01); *H04L 67/10* (2013.01)

(58) Field of Classification Search
CPC ............... G06F 16/248; G06F 16/9535; G06F 16/9537; G06F 17/2785; G06F 3/0482; G06F 9/453; G10L 15/1822; G10L 17/005; G10L 17/22
See application file for complete search history.

(56) References Cited

U.S. PATENT DOCUMENTS

| | | | |
|---|---|---|---|
| 8,380,721 B2 | 2/2013 | Attaran Rezaei et al. | |
| 8,825,699 B2 | 9/2014 | Kruzeniski et al. | |
| 8,850,329 B1* | 9/2014 | Hill | G06F 17/2247 715/745 |
| 9,767,488 B1* | 9/2017 | Wang | G06Q 30/0275 |
| 2002/0152202 A1* | 10/2002 | Perro | G06F 16/3334 |
| 2005/0246320 A1 | 11/2005 | Benysh et al. | |
| 2006/0059028 A1 | 3/2006 | Eder | |
| 2009/0204581 A1 | 8/2009 | Lim | |
| 2010/0217604 A1* | 8/2010 | Baldwin | G06Q 30/02 704/275 |
| 2012/0016678 A1 | 1/2012 | Gruber et al. | |
| 2013/0311925 A1* | 11/2013 | Denker | G06F 3/013 715/771 |
| 2014/0052527 A1* | 2/2014 | Roundtree | G06Q 30/0245 705/14.44 |
| 2014/0164400 A1 | 6/2014 | Kruglick | |
| 2014/0258339 A9 | 9/2014 | Singh et al. | |
| 2014/0324827 A1 | 10/2014 | Hanses et al. | |
| 2014/0358970 A1 | 12/2014 | Morris et al. | |
| 2015/0019203 A1 | 1/2015 | Smith et al. | |
| 2015/0052115 A1* | 2/2015 | Sharifi | G06Q 30/0631 707/722 |
| 2015/0094041 A1* | 4/2015 | Jung | H04M 3/42229 455/414.1 |
| 2015/0127628 A1* | 5/2015 | Rathod | H04W 4/21 707/710 |
| 2016/0110472 A1* | 4/2016 | Cheung | H04L 67/02 715/234 |
| 2016/0171119 A1* | 6/2016 | Bufe | G06F 16/9535 715/746 |
| 2016/0179864 A1* | 6/2016 | Roberts | G06F 16/9535 707/609 |
| 2016/0205238 A1* | 7/2016 | Abramson | G01C 21/3484 455/456.4 |

OTHER PUBLICATIONS

"International Preliminary Report on Patentability Issued in PCT Application No. PCT/US2016/013769" dated Apr. 7, 2017, (6 Pages total).

Gillick, et al., "Context-Dependent Fine-Grained Entity Type Tagging", In Proceeding of Computing Research Repository, Dec. 3, 2014, (9 pages total).

Cutrell, et al., "Fast, Flexible Filtering with Phlat—Personal Search and Organization Made Easy", In Proceedings of the SIGCHI Conference on Human Factors in Computing Systems, Apr. 22, 2006, (10 pages total).

Dumais, Susan, "Using Context to Support Searchers in Searching", Published on: Jun. 18, 2008, Available at: http://research.microsoft.com/en-us/um/people/sdunnais/ACL2008-Dumais-Share.pdf (34 pages total).

"International Search Report and Written Opinion Issued in PCT Application No. PCT/US2016/013769", dated Apr. 29, 2016, (12 Pages total).

* cited by examiner

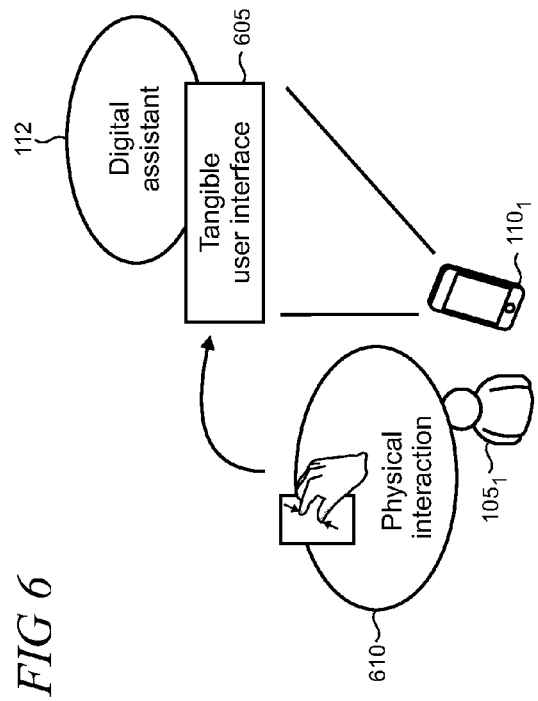
FIG 6
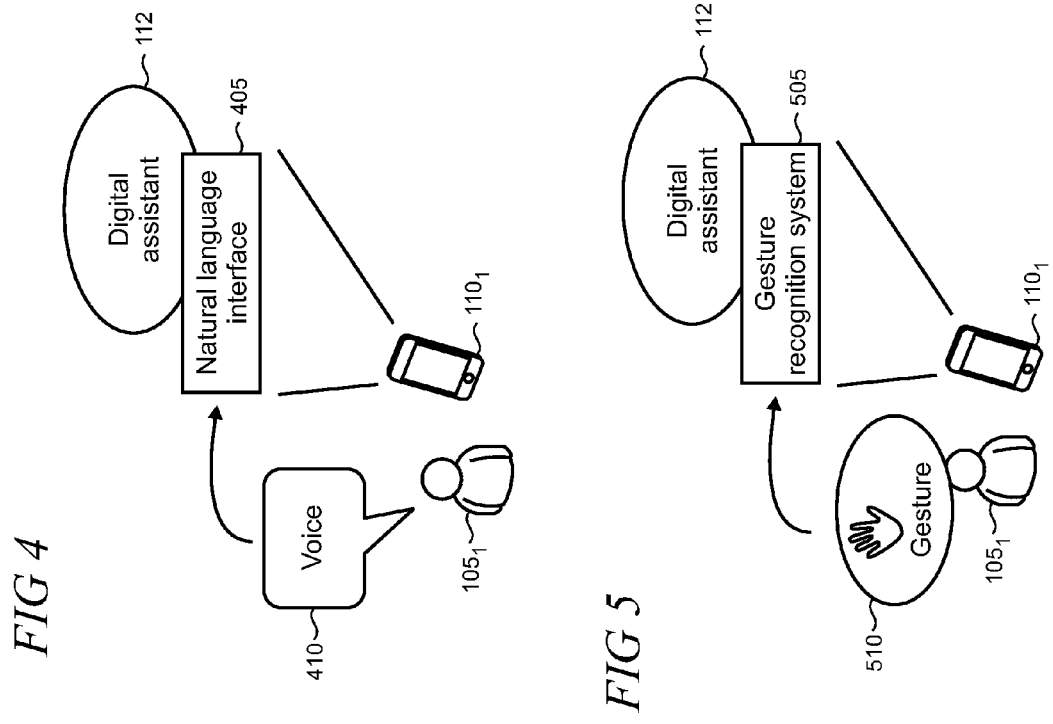
FIG 4
FIG 5

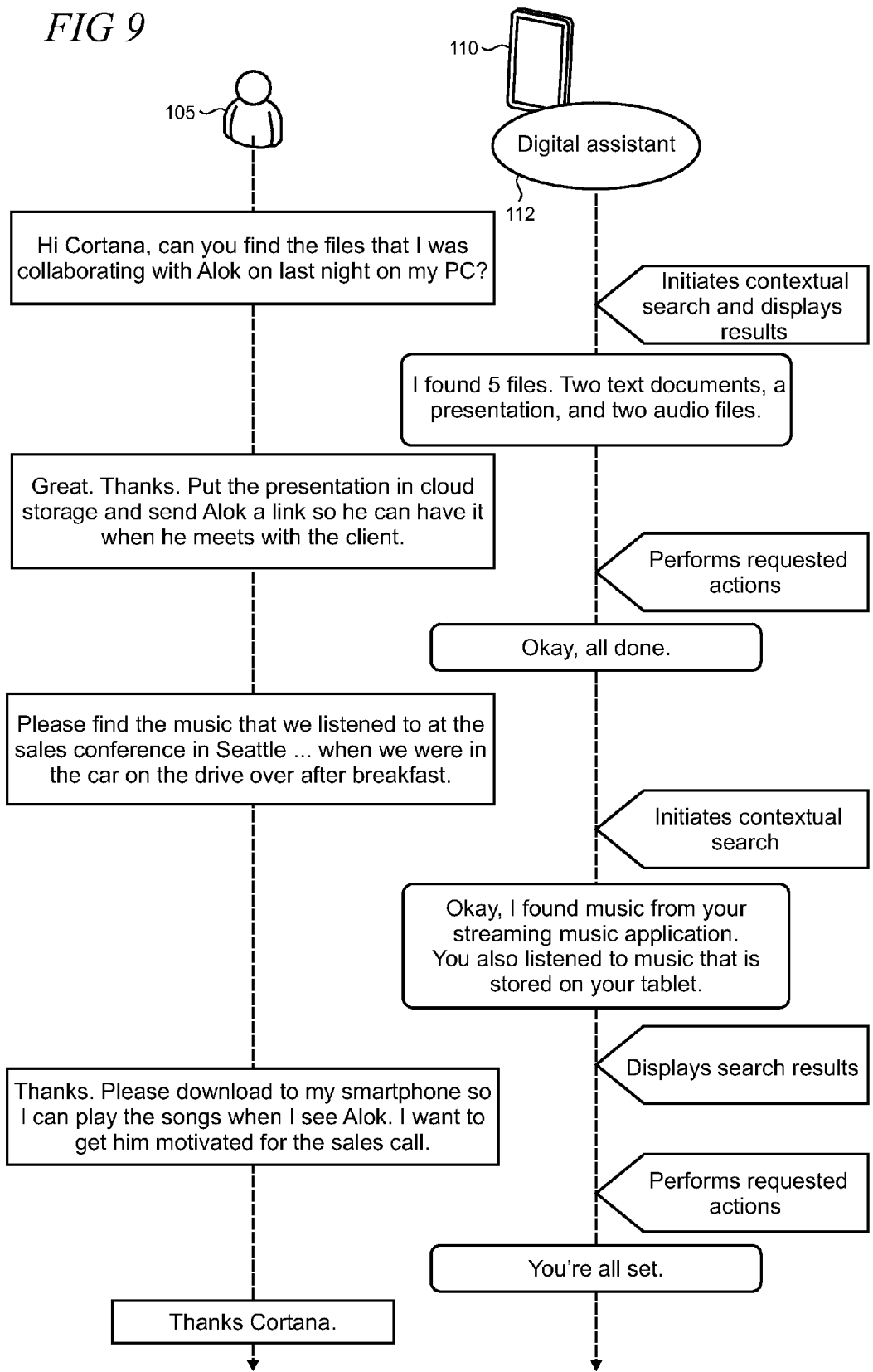

CONTEXTUAL SEARCH USING NATURAL LANGUAGE

CROSS REFERENCE TO RELATED APPLICATION

This application claims benefit and priority to U.S. Provisional Application Ser. No. 62/106,186 filed Jan. 21, 2015, entitled "Contextual Search using Natural Language" which is incorporated herein by reference in its entirety.

BACKGROUND

Digital assistants can provide a variety of features for device users and can make it easier to interact with devices to perform tasks, get information, and stay connected with friends and colleagues using voice interactions. Typically, the user can interact with the digital assistant using natural inputs including voice, and the digital assistant can respond, including speaking to the user using its own voice. Current features perform in a satisfactory manner for many use scenarios, but increased functionality can make digital assistants even more beneficial and productive.

SUMMARY

A contextually aware digital assistant supported on devices such as smartphones, tablet computers, wearable computing devices, personal computers (PCs), game consoles, smart place-based devices, vehicles, and the like is configured with a natural language interface that enables a user to launch searches for content using contextual references such as time, date, event, location, schedule, activity, contacts, or device. The user can thus use natural language to express the context that is applicable to the sought-after content rather than having to formulate a query that uses a specific syntax. The digital assistant can comprehensively search for the content across applications (i.e., both first and third party applications), devices, and services, or any combination of the three. Accordingly, when using a device, the user can ask the digital assistant to search for particular content simply by specifying the context to be used as search criteria. For example, the user can ask the digital assistant to find the documents worked on earlier in the week using a tablet device when on the subway with a friend. The digital assistant can initiate a search in response to the user's natural language request and provide the comprehensive results to the user in a single, integrated user interface (UI) such as a canvas supported by the digital assistant or operating system running on the device. The user may select content from the search results which the digital assistant can render on the local device and/or download from a remote device and/or service.

Initiating contextual searches using the digital assistant improves the user experience by letting users formulate search queries in a flexible, intuitive, or natural manner that forgoes rigid syntactical rules. By using context when searching, the digital assistant can provide results that can be expected to be more nuanced, meaningful, comprehensive, and relevant to the user as compared to traditional search methods. In addition, by extending the search across applications, devices, and services and then consolidating the results, the digital assistant provides an easy and effective way for users to find, access, and manage their content from a single place on a device UI. The context aware digital assistant increases user efficiency when interacting with the device by enabling the user to quickly and accurately locate particular content from a variety of sources, services, applications, and locations. Opportunities for the user to make mistakes and input errors are also reduced. Accordingly, when the user employs the context aware digital assistant to search for, access, and manage content, the device can operate more efficiently while preserving computing resources such as battery power, memory, processing cycles, network utilization, device utilization, and the like, which can be limited (e.g., for battery operated and/or mobile devices).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIGS. 4, 5, and 6 show illustrative interfaces between a user and a digital assistant;

FIG. 9 shows an illustrative contextual search scenario;

Like reference numerals indicate like elements in the drawings. Elements are not drawn to scale unless otherwise indicated.

DETAILED DESCRIPTION

Figure 1:
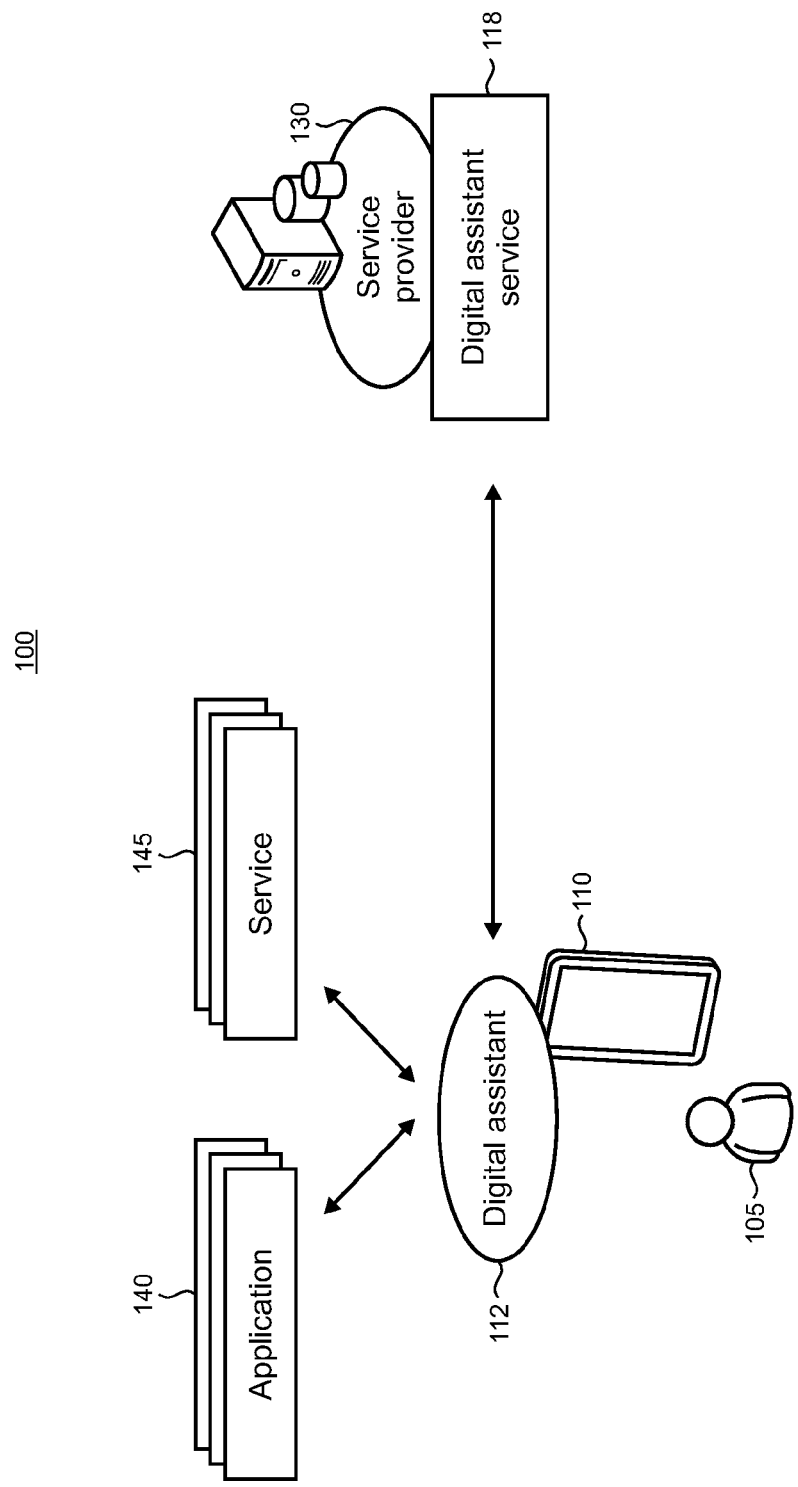
FIG. 1 shows an illustrative digital assistant which interfaces with applications and services.

FIG. 1 shows an overview of an illustrative communications environment 100 for implementing the present contextual search using natural language in which a user 105 employs a device 110 that hosts a digital assistant 112. The digital assistant 112 typically interoperates with a service 118 supported by a remote service provider 130. The digital assistant 112 is configured to enable interaction with applications 140 and services 145. The applications can include first party and third party applications in some cases. The services 145 can be provided by remote service providers that can interact with local clients and/or applications.

Figure 2:
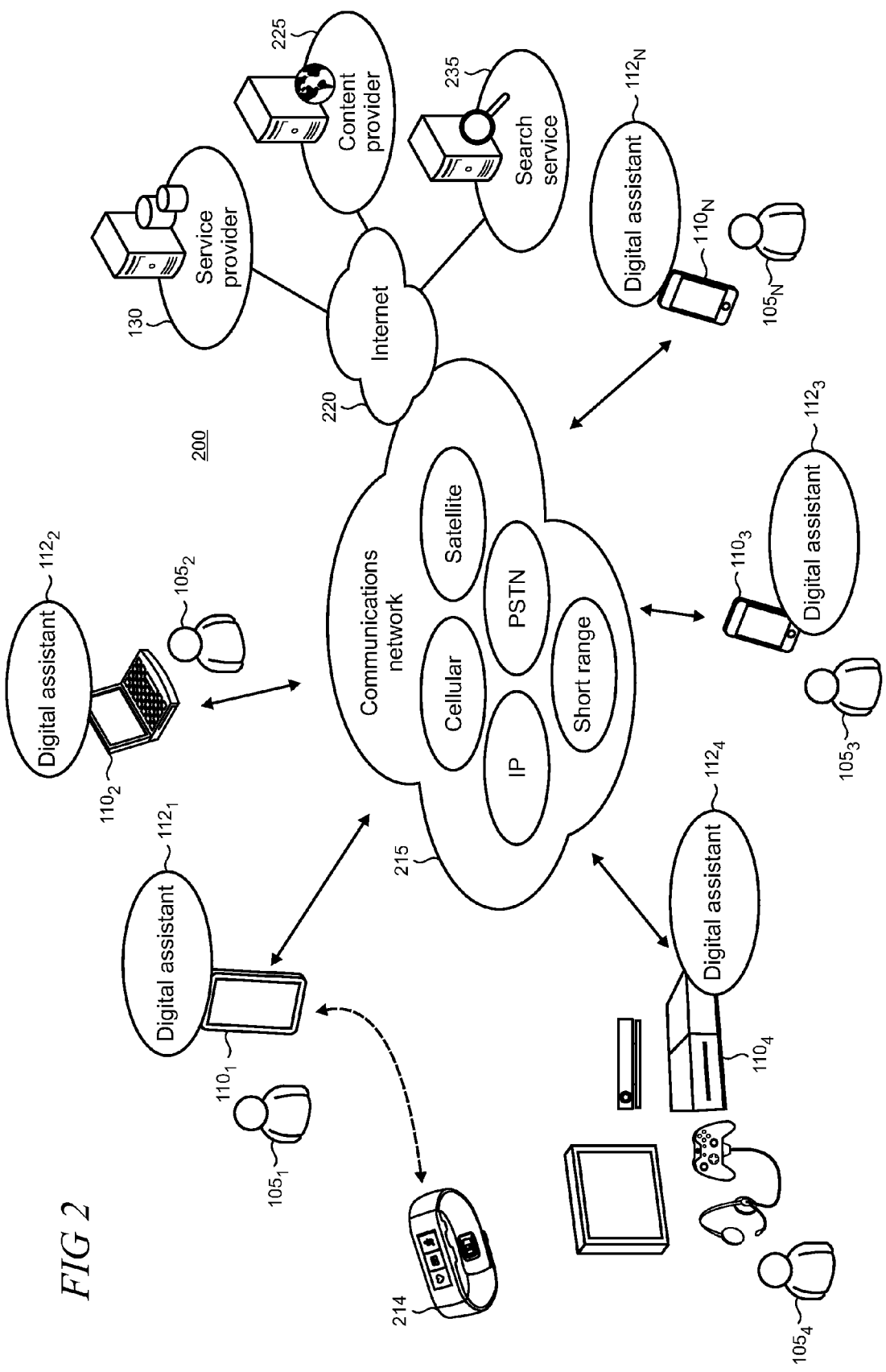
FIG. 2 shows an illustrative computing environment in which devices can communicate and interact over a network.

Various details of illustrative implementations of contextual search using natural language are now presented. FIG. 2 shows an illustrative environment 200 in which various users 105 employ respective devices 110 that communicate over a communications network 215. Each device 110 includes an instance of the digital assistant 112. The devices 110 can support voice telephony capabilities in some cases and typically support data-consuming applications such as Internet browsing and multimedia (e.g., music or video) consumption in addition to various other features. The devices 110 may include, for example, user equipment, mobile phones, cell phones, feature phones, tablet computers, and smartphones which users often employ to make and receive voice and/or multimedia (i.e., video) calls, engage in messaging (e.g., texting) and email communications, use applications and access services that employ data, browse the World Wide Web, and the like.

However, alternative types of electronic devices are also envisioned to be usable within the communications environment 100 so long as they are configured with communication capabilities and can connect to the communications network 115. Such alternative devices variously include handheld computing devices, PDAs (personal digital assistants), portable media players, devices that use headsets and earphones (e.g., Bluetooth-compatible devices), phablet devices (i.e., combination smartphone/tablet devices), wearable computing devices, head mounted display (HMD) systems, navigation devices such as GPS (Global Positioning System) systems, laptop PCs (personal computers), desktop computers, computing platforms installed in cars and other vehicles, embedded systems (e.g., those installed in homes or offices), multimedia consoles, gaming systems, or the like. In the discussion that follows, the use of the term "device" is intended to cover all devices that are configured with communication capabilities and are capable of connectivity to the communications network 115. In some cases, a given device can communicate through a second device, or by using capabilities supported in the second device, in order to gain access to one or more of applications, services, or content.

The various devices 110 in the environment 200 can support different features, functionalities, and capabilities (here referred to generally as "features"). Some of the features supported on a given device can be similar to those supported on others, while other features may be unique to a given device. The degree of overlap and/or distinctiveness among features supported on the various devices 110 can vary by implementation. For example, some devices 110 can support touch controls, gesture recognition, and voice commands, while others may enable a more limited UI. Some devices may support video consumption and Internet browsing, while other devices may support more limited media handling and network interface features.

As shown, the devices 110 can access a communications network 115 in order to implement various user experiences. The communications network can include any of a variety of network types and network infrastructure in various combinations or sub-combinations including cellular networks, satellite networks, IP (Internet-Protocol) networks such as Wi-Fi and Ethernet networks, a public switched telephone network (PSTN), and/or short range networks such as Bluetooth® networks. The network infrastructure can be supported, for example, by mobile operators, enterprises, Internet service providers (ISPs), telephone service providers, data service providers, and the like. The communications network 115 typically includes interfaces that support a connection to the Internet 220 so that the mobile devices 110 can access content provided by one or more content providers 225 and also access the service provider 130 in some cases. A search service 235 may also be supported in the environment 200.

The communications network 115 is typically enabled to support various types of device-to-device communications including over-the-top communications, and communications that do not utilize conventional telephone numbers in order to provide connectivity between parties.

Accessory devices 214, such as wristbands and other wearable devices may also be present in the environment 200. Such accessory device 214 typically is adapted to interoperate with a device 110 using a short range communication protocol like Bluetooth to support functions such as monitoring of the wearer's physiology (e.g., heart rate, steps taken, calories burned) and environmental conditions (temperature, humidity, ultra-violet (UV) levels), and surfacing notifications from the coupled device 110.

Figure 3:
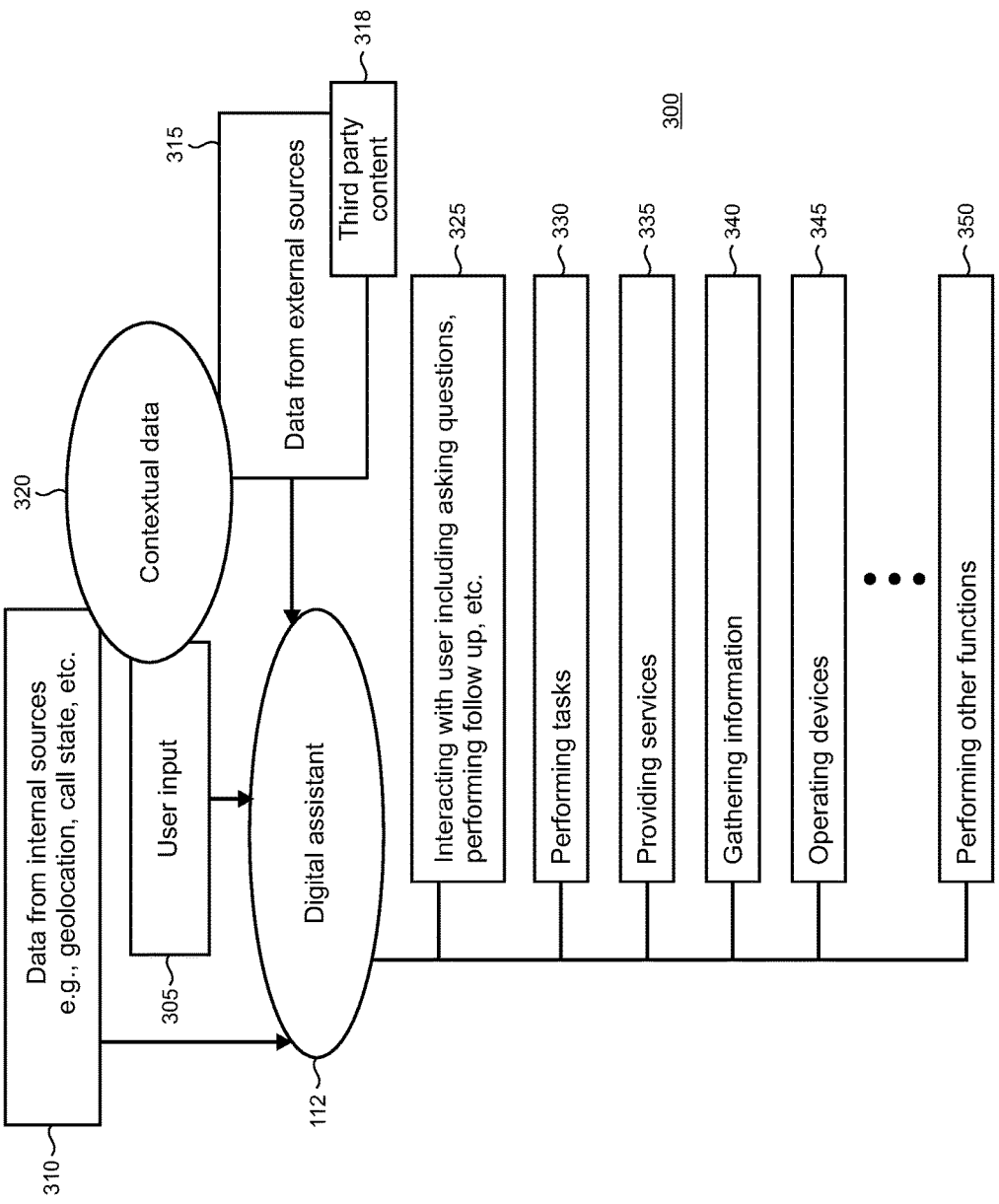
FIG. 3 shows illustrative inputs to a digital assistant and an illustrative taxonomy of general functions that may be performed by a digital assistant.

FIG. 3 shows an illustrative taxonomy of functions 300 that may typically be supported by the digital assistant 112 either natively or in combination with an application 140 or service 145. Inputs to the digital assistant 112 typically can include user input 305, data from internal sources 310, and data from external sources 315 which can include third-party content 318. For example, data from internal sources 310 could include the current location of the device 110 that is reported by a GPS (Global Positioning System) component on the device, or some other location-aware component. The externally sourced data 315 includes data provided, for example, by external systems, databases, services, and the like such as the service provider 130 (FIG. 1).

The various inputs can be used alone or in various combinations to enable the digital assistant 112 to utilize contextual data 320 when it operates. Contextual data can include, for example, time/date, the user's location, language, schedule, applications installed on the device, the user's preferences, the user's behaviors (in which such behaviors are monitored/tracked with notice to the user and the user's consent), stored contacts (including, in some cases, links to a local user's or remote user's social graph such as those maintained by external social networking services), call history, messaging history, browsing history, device type, device capabilities, communication network type and/or features/functionalities provided therein, mobile data plan restrictions/limitations, data associated with other parties to a communication (e.g., their schedules, preferences), and the like.

As shown, the functions 300 illustratively include interacting with the user 325 (through the natural language UI and other graphical UIs, for example); performing tasks 330 (e.g., making note of appointments in the user's calendar, sending messages and emails); providing services 335 (e.g., answering questions from the user, mapping directions to a destination, setting alarms, forwarding notifications, reading emails, news, blogs); gathering information 340 (e.g., finding information requested by the user about a book or movie, locating the nearest Italian restaurant); operating devices 345 (e.g., setting preferences, adjusting screen brightness, turning wireless connections such as Wi-Fi and Bluetooth on and off, communicating with other devices, controlling smart appliances); and performing various other functions 350. The list of functions 300 is not intended to be exhaustive and other functions may be provided by the digital assistant 112 and/or applications 140 as may be needed for a particular implementation of the present contextual search using natural language.

As shown in FIG. 4, the digital assistant 112 can employ a natural language interface 405 that has a user interface (UI) that can take voice inputs 410 from the user 105. The voice inputs 410 can be used to invoke various actions, features, and functions on a device 110, provide inputs to the systems and applications, and the like. In some cases, the voice inputs 410 can be utilized on their own in support of a particular user experience while in other cases the voice input can be utilized in combination with other non-voice inputs or inputs such as those implementing physical controls on the device or virtual controls implemented on a UI or those using gestures (as described below).

The digital assistant 112 can also employ a gesture recognition system 505 having a UI as shown in FIG. 5. Here, the system 505 can sense gestures 510 performed by the user 105 as inputs to invoke various actions, features, and functions on a device 110, provide inputs to the systems and applications, and the like. The user gestures 510 can be sensed using various techniques such as optical sensing, touch sensing, proximity sensing, and the like. In some cases, various combinations of voice commands, gestures, and physical manipulation of real or virtual controls can be utilized to interact with the digital assistant. In some scenarios, the digital assistant can be automatically invoked. For example, as the digital assistant typically maintains awareness of device state and other context, the digital assistant may be invoked by specific context such as user input, received notifications, or detected events.

As shown in FIG. 6, the digital assistant may expose a tangible user interface 605 that enables the user 105 to employ physical interactions 610 in support of user experiences on the device 110. Such physical interactions can include manipulation of physical and/or virtual controls such as buttons, menus, keyboards, using touch-based inputs like tapping, flicking, or dragging on a touchscreen, and the like.

The digital assistant may be configured to be launched from any location within any UI on the device, or from within any current user experience. For example, the user 105 can be on a phone call, browsing the web, watching a video, or listening to music, and simultaneously launch the digital assistant from within any of those experiences. In some cases the digital assistant can be launched through manipulation of a physical or virtual user control, and/or by voice command and/or gesture in other cases.

Figure 7:
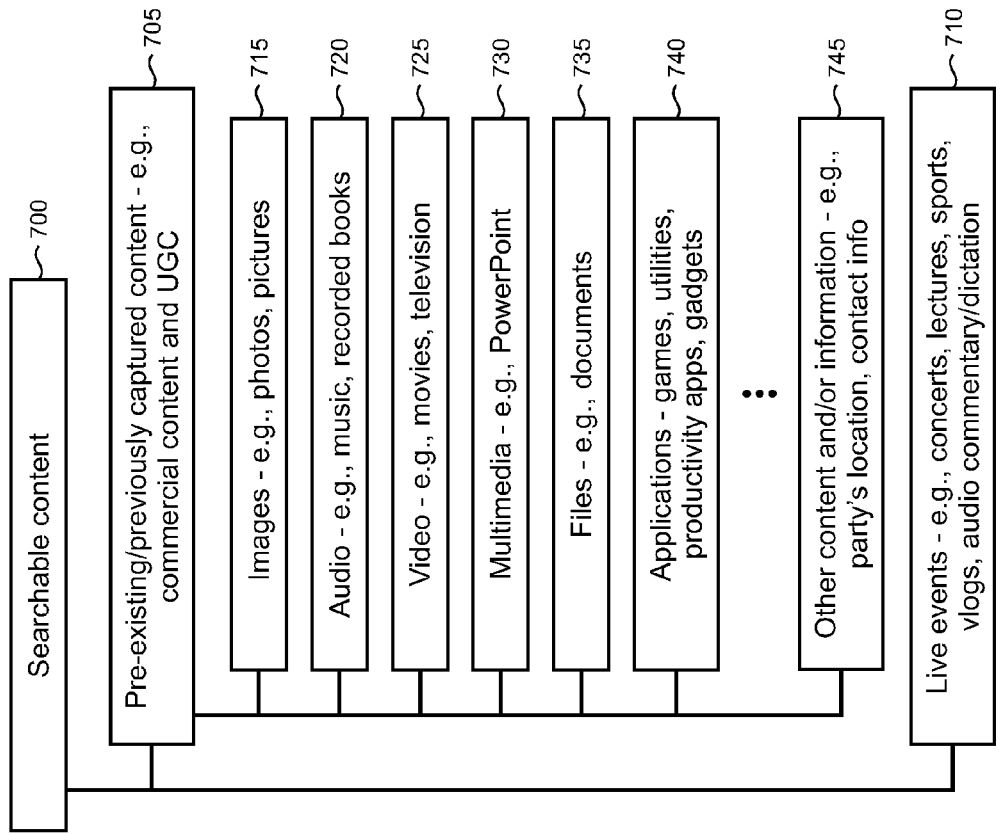
FIG. 7 shows an illustrative taxonomy of searchable content.

Various types of content can be searched using the present contextual search using natural language. The content can be provided and/or supported by the applications 140 (FIG. 1) and/or the service 145. FIG. 7 shows an illustrative taxonomy of searchable content 700. It is noted that the searchable content can be stored locally on a device, or be stored remotely from the device but still be accessible to the device. For example, the searchable content can be stored in a cloud store, be available on a network such as a local area network, be accessed using a connection to another device, and the like.

As shown in FIG. 7, the searchable content 700 can include both pre-existing and/or previously captured content 705 (e.g., commercially available content and/or user-generated content (UGC)), as well as content 710 associated with live events (e.g., concerts, lectures, sporting events, audio commentary/dictation, video logs (vlogs)). As shown, illustrative examples of existing and/or previously captured content 705 include images 715, audio 720, video 725, multimedia 730, files 735, applications 740, and other content and/or information. The shareable content shown in FIG. 7 is illustrative and not intended to be exhaustive. The types of content utilized can vary according to the needs of a particular implementation.

Figure 8:
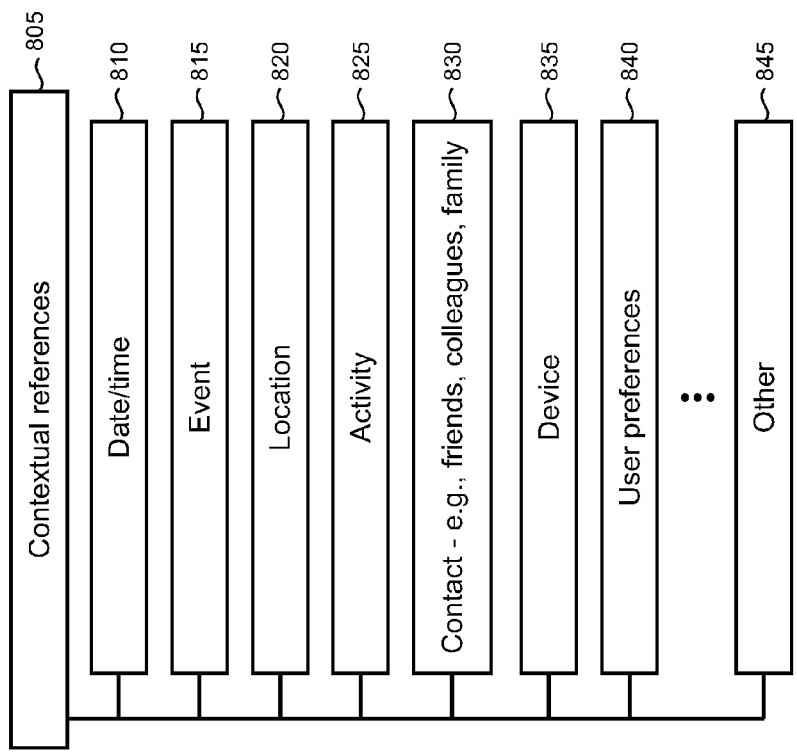
FIG. 8 shows an illustrative taxonomy of contextual references.

FIG. 8 shows illustrative contextual references 805 that may be used when performing a contextual search. The contextual references 805 may include date/time 810, event 815, location 820, activity 825, contact 830, device 835, user preferences 840, or other references 845 as may be needed for a particular implementation of contextual searching.

FIG. 9 shows an illustrative contextual search scenario in which the user 105 has interactions with the digital assistant 112 operating on device 110. In this illustrative scenario, the digital assistant is invoked by the name "Cortana." The user first asks for a search for files that he previously worked on with a colleague. Here, the contextual references parsed out of the user's language by the digital assistant include date/time, contact, and device. The digital assistant responsively initiates a search using that context and presents the search results to the user. The user then asks for another search for music files. In this case, the contextual references include location and activity. Accordingly, the digital assistant can examine the user's calendar to determine when the user was at the particular location in order to find the requested content.

Figure 10:
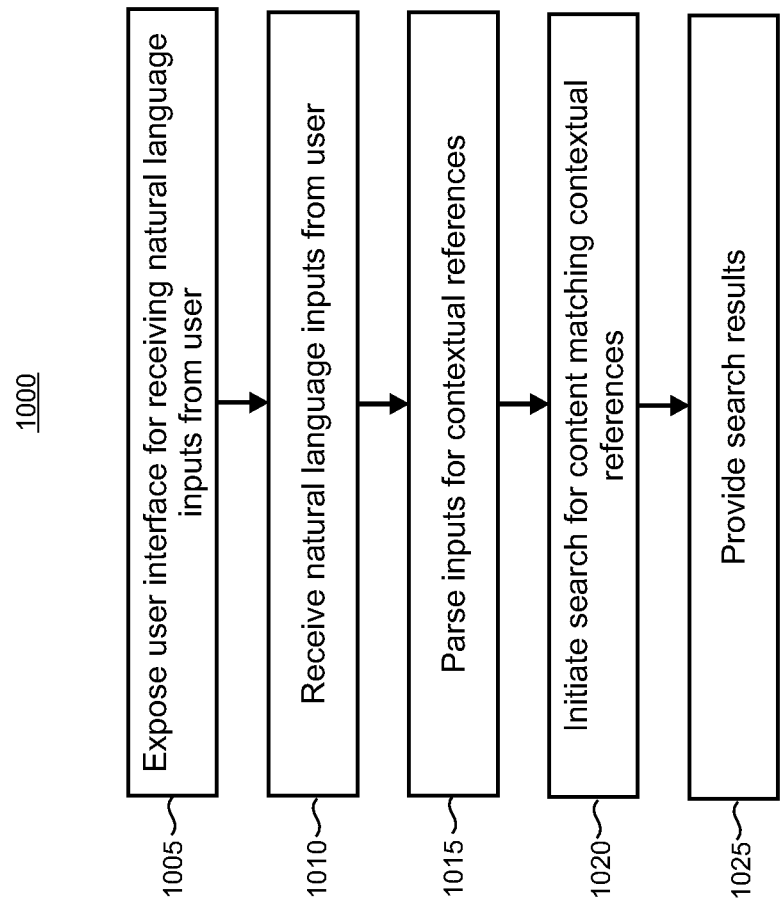
FIGS. 10-12 show illustrative methods that may be performed when implementing the present contextual search using natural language.

FIG. 10 shows a flowchart of an illustrative method 1000 for operating a digital assistant on a device. Unless specifically stated, the methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 1005, the digital assistant exposes a user interface and receives natural language inputs from the user in step 1010. In step 1015, the inputs from the user are parsed to identify contextual references. The digital assistant can initiate a search for content that matches the contextual references in step 1020. The digital assistant provides search results in step 1025. The results can be rank ordered and display the appropriate contextual reference in some cases.

Figure 11:
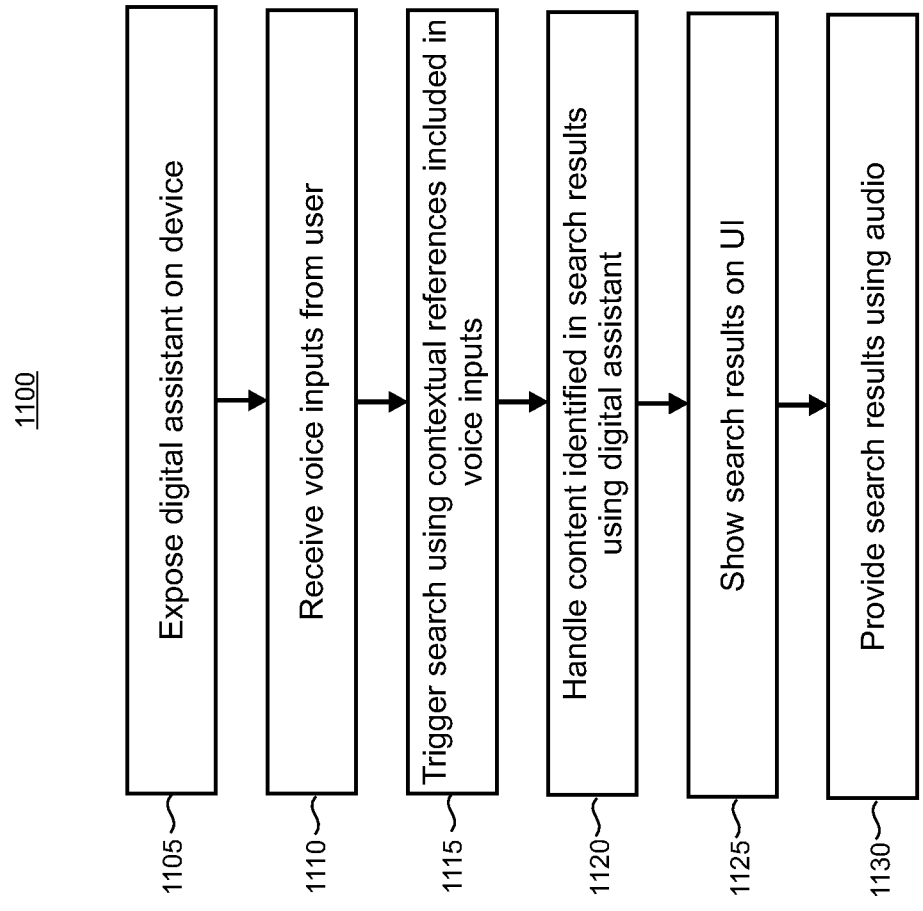

FIG. 11 shows a flowchart of an illustrative method 1100 that may be performed on a device that includes one or more processors, a UI, and a memory device storing computer-readable instructions. In step 1105, a digital assistant that is configured for voice interactions with a user using the UI is exposed. In step 1110, voice inputs from the user are received. A search using the contextual references from the voice inputs is triggered in step 1115. The digital assistant handles content identified in search results in step 1120. The handling can take various suitable forms. For example, the digital assistant can fetch content for consumption, provide content or links to content to other users, devices, locations, application or services, store or copy content, manipulate or transform content, edit content, augment content, and the like. Such handling may also be responsive to interactions with the user over the UI, for example using a natural language interface or protocol.

In step 1125, search results are shown on the device UI. Search results can be presented in an aggregated manner so that the user can go to a single place on the UI to view, access, and manipulate content that meets the search criteria. Search results can also be provided to the user using audio in step 1130. For example, the digital assistant can read the search results aloud to the user.

Figure 12:
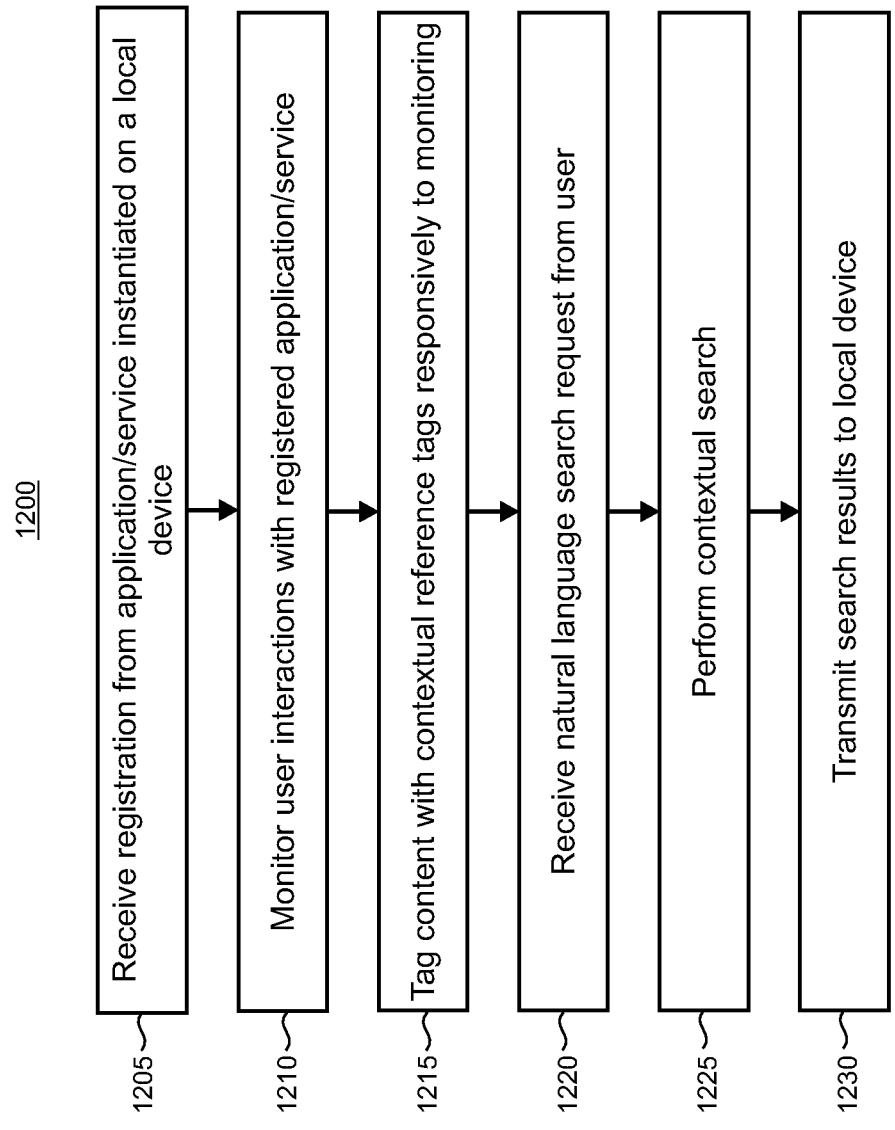

FIG. 12 shows a flowchart of an illustrative method 1200 that may be performed by a service that supports a digital assistant. In step 1205, the service can receive registrations from applications and/or services that are instantiated on a device. User interactions with the registered applications and services are monitored in step 1210 (typically with notice to the user and with user consent). Content is tagged in step 1215 with contextual reference tags including one or more of time, date, event, location, schedule, activity, contact, or device. A search request from the user is received in step 1220 and a responsive search is performed in step 1225. Search results are transmitted to the device in step 1230.

Figure 13:
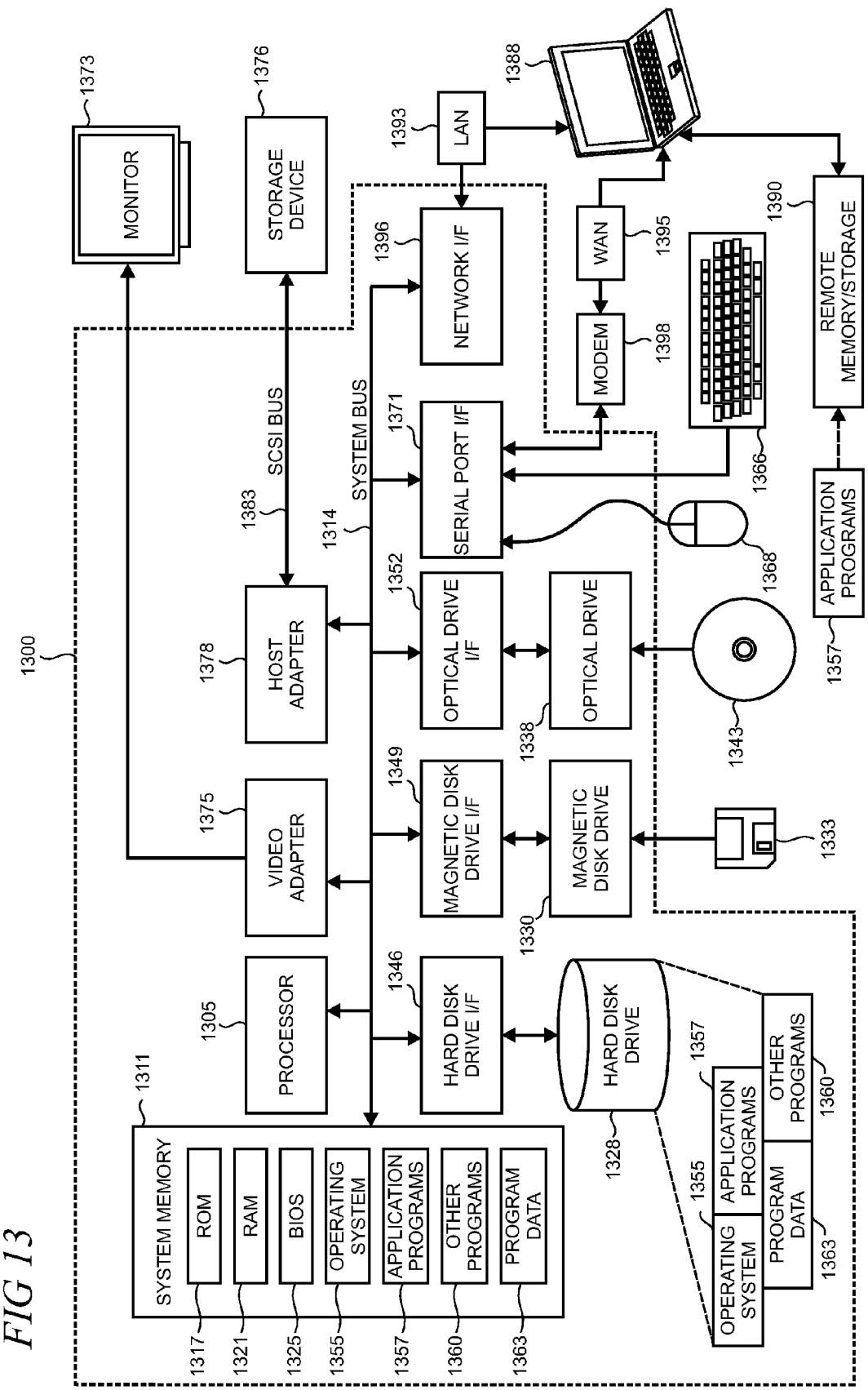
FIG. 13 is a simplified block diagram of an illustrative computer system such as a personal computer (PC) that may be used in part to implement the present contextual search using natural language.

FIG. 13 is a simplified block diagram of an illustrative computer system 1300 such as a PC, client machine, or server with which the present contextual search using natural language may be implemented. Computer system 1300 includes a processor 1305, a system memory 1311, and a system bus 1314 that couples various system components including the system memory 1311 to the processor 1305. The system bus 1314 may be any of several types of bus structures including a memory bus or memory controller, a peripheral bus, or a local bus using any of a variety of bus architectures. The system memory 1311 includes read only memory (ROM) 1317 and random access memory (RAM) 1321. A basic input/output system (BIOS) 1325, containing the basic routines that help to transfer information between elements within the computer system 1300, such as during startup, is stored in ROM 1317. The computer system 1300 may further include a hard disk drive 1328 for reading from and writing to an internally disposed hard disk (not shown), a magnetic disk drive 1330 for reading from or writing to a removable magnetic disk 1333 (e.g., a floppy disk), and an optical disk drive 1338 for reading from or writing to a removable optical disk 1343 such as a CD (compact disc), DVD (digital versatile disc), or other optical media. The hard disk drive 1328, magnetic disk drive 1330, and optical disk drive 1338 are connected to the system bus 1314 by a hard disk drive interface 1346, a magnetic disk drive interface 1349, and an optical drive interface 1352, respectively. The drives and their associated computer-readable storage media provide non-volatile storage of computer-readable instructions, data structures, program modules, and other data for the computer system 1300. Although this illustrative example includes a hard disk, a removable magnetic disk 1333, and a removable optical disk 1343, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present digital assistant. In addition, as used herein, the term computer-readable storage media includes one or more instances of a media type (e.g., one or more magnetic disks or one or more CDs). For purposes of this specification and the claims, the phrase "computer-readable storage media" and variations thereof, does not include waves, signals, and/or other transitory and/or intangible communication media.

A number of program modules may be stored on the hard disk, magnetic disk 1333, optical disk 1343, ROM 1317, or RAM 1321, including an operating system 1355, one or more application programs 1357, other program modules 1360, and program data 1363. A user may enter commands and information into the computer system 1300 through input devices such as a keyboard 1366 and pointing device 1368 such as a mouse. Other input devices (not shown) may include a microphone, joystick, game pad, satellite dish, scanner, trackball, touchpad, touch screen, touch-sensitive device, voice-command module or device, user motion or user gesture capture device, or the like. These and other input devices are often connected to the processor 1305 through a serial port interface 1371 that is coupled to the system bus 1314, but may be connected by other interfaces, such as a parallel port, game port, or universal serial bus (USB). A monitor 1373 or other type of display device is also connected to the system bus 1314 via an interface, such as a video adapter 1375. In addition to the monitor 1373, personal computers typically include other peripheral output devices (not shown), such as speakers and printers. The illustrative example shown in FIG. 13 also includes a host adapter 1378, a Small Computer System Interface (SCSI) bus 1383, and an external storage device 1376 connected to the SCSI bus 1383.

The computer system 1300 is operable in a networked environment using logical connections to one or more remote computers, such as a remote computer 1388. The remote computer 1388 may be selected as another personal computer, a server, a router, a network PC, a peer device, or other common network node, and typically includes many or all of the elements described above relative to the computer system 1300, although only a single representative remote memory/storage device 1390 is shown in FIG. 13. The logical connections depicted in FIG. 13 include a local area network (LAN) 1393 and a wide area network (WAN) 1395. Such networking environments are often deployed, for example, in offices, enterprise-wide computer networks, intranets, and the Internet.

When used in a LAN networking environment, the computer system 1300 is connected to the local area network 1393 through a network interface or adapter 1396. When used in a WAN networking environment, the computer system 1300 typically includes a broadband modem 1398, network gateway, or other means for establishing communications over the wide area network 1395, such as the Internet. The broadband modem 1398, which may be internal or external, is connected to the system bus 1314 via a serial port interface 1371. In a networked environment, program modules related to the computer system 1300, or portions thereof, may be stored in the remote memory storage device 1390. It is noted that the network connections shown in FIG. 13 are illustrative and other means of establishing a communications link between the computers may be used depending on the specific requirements of an application of the present contextual search using natural language.

Figure 14:
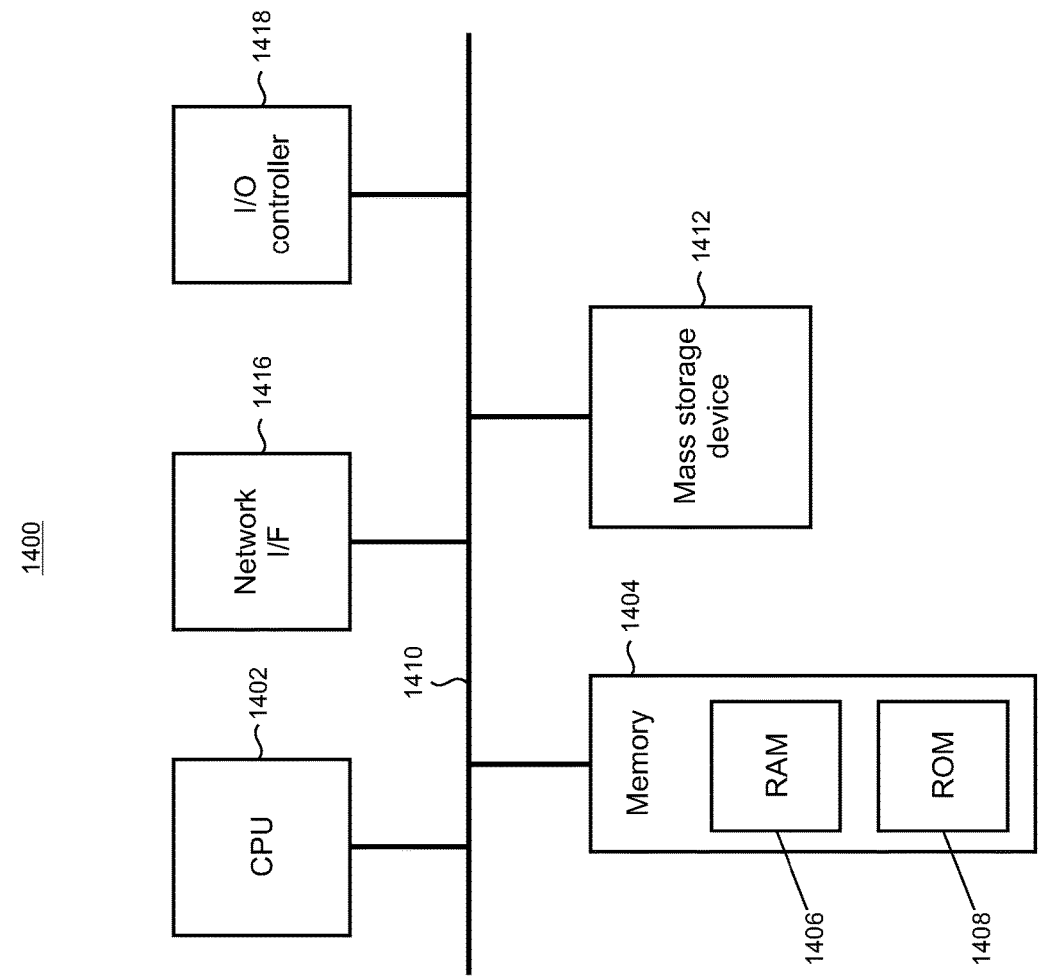
FIG. 14 shows a block diagram of an illustrative device that may be used in part to implement the present contextual search using natural language.

FIG. 14 shows an illustrative architecture 1400 for a device capable of executing the various components described herein for providing the present contextual search using natural language. Thus, the architecture 1400 illustrated in FIG. 14 shows an architecture that may be adapted for a server computer, mobile phone, a PDA, a smartphone, a desktop computer, a netbook computer, a tablet computer, GPS device, gaming console, and/or a laptop computer. The architecture 1400 may be utilized to execute any aspect of the components presented herein.

The architecture 1400 illustrated in FIG. 14 includes a CPU (Central Processing Unit) 1402, a system memory 1404, including a RAM 1406 and a ROM 1408, and a system bus 1410 that couples the memory 1404 to the CPU 1402. A basic input/output system containing the basic routines that help to transfer information between elements within the architecture 1400, such as during startup, is stored in the ROM 1408. The architecture 1400 further includes a mass storage device 1412 for storing software code or other computer-executed code that is utilized to implement applications, the file system, and the operating system.

The mass storage device 1412 is connected to the CPU 1402 through a mass storage controller (not shown) connected to the bus 1410. The mass storage device 1412 and its associated computer-readable storage media provide non-volatile storage for the architecture 1400.

Although the description of computer-readable storage media contained herein refers to a mass storage device, such as a hard disk or CD-ROM drive, it should be appreciated by those skilled in the art that computer-readable storage media can be any available storage media that can be accessed by the architecture 1400.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 1400.

According to various embodiments, the architecture 1400 may operate in a networked environment using logical connections to remote computers through a network. The architecture 1400 may connect to the network through a network interface unit 1416 connected to the bus 1410. It should be appreciated that the network interface unit 1416 also may be utilized to connect to other types of networks and remote computer systems. The architecture 1400 also may include an input/output controller 1418 for receiving and processing input from a number of other devices, including a keyboard, mouse, or electronic stylus (not shown in FIG. 14). Similarly, the input/output controller 1418 may provide output to a display screen, a printer, or other type of output device (also not shown in FIG. 14).

It should be appreciated that the software components described herein may, when loaded into the CPU 1402 and executed, transform the CPU 1402 and the overall architecture 1400 from a general-purpose computing system into a special-purpose computing system customized to facilitate the functionality presented herein. The CPU 1402 may be constructed from any number of transistors or other discrete circuit elements, which may individually or collectively assume any number of states. More specifically, the CPU 1402 may operate as a finite-state machine, in response to executable instructions contained within the software modules disclosed herein. These computer-executable instructions may transform the CPU 1402 by specifying how the CPU 1402 transitions between states, thereby transforming the transistors or other discrete hardware elements constituting the CPU 1402.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the architecture 1400 in order to store and execute the software components presented herein. It also should be appreciated that the architecture 1400 may include other types of computing devices, including handheld computers, embedded computer systems, smartphones, PDAs, and other types of computing devices known to those skilled in the art. It is also contemplated that the architecture 1400 may not include all of the components shown in FIG. 14, may include other components that are not explicitly shown in FIG. 14, or may utilize an architecture completely different from that shown in FIG. 14.

Figure 15:
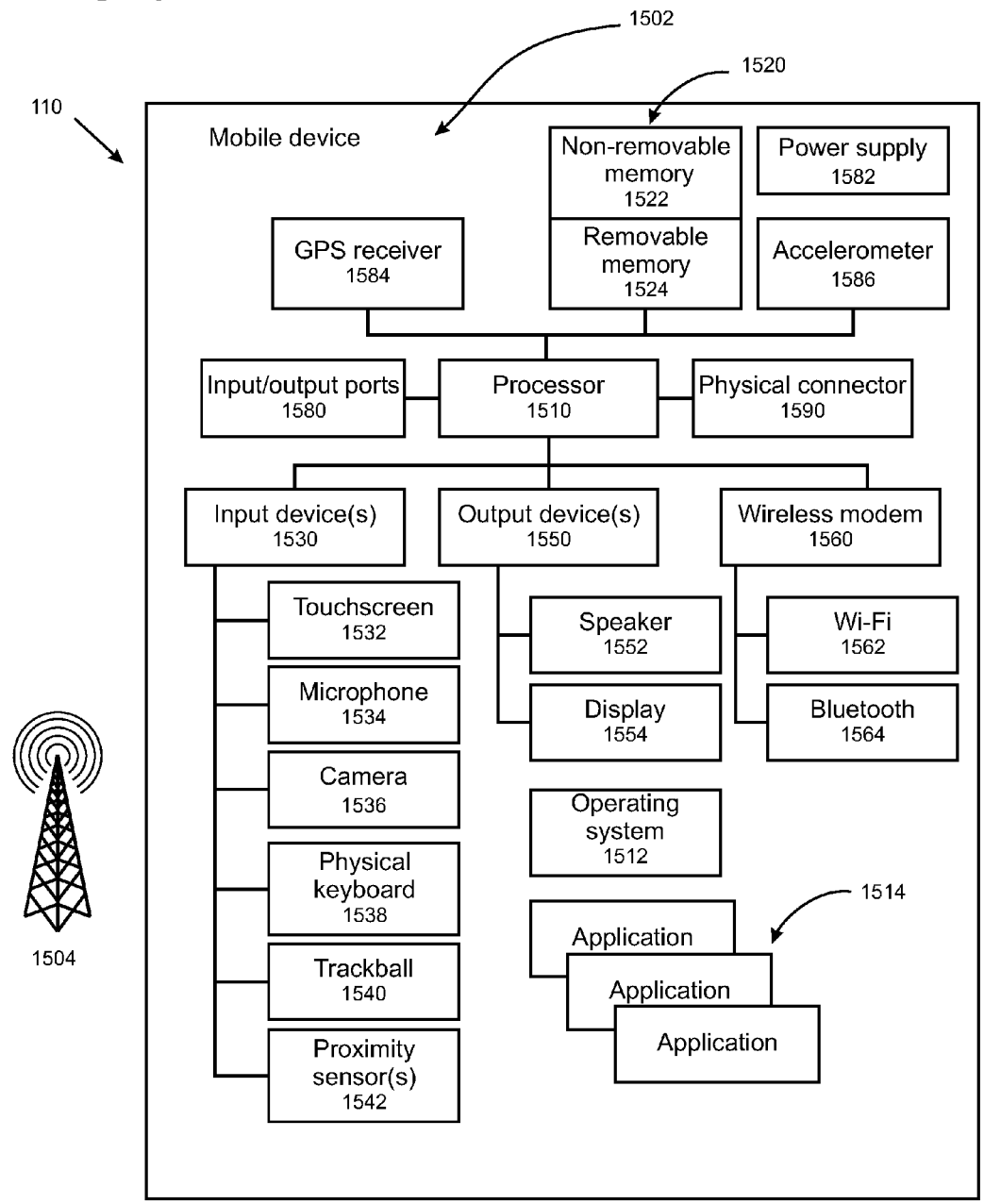
FIG. 15 is a block diagram of an illustrative mobile device.

FIG. 15 is a functional block diagram of an illustrative device 110 such as a mobile phone or smartphone including a variety of optional hardware and software components, shown generally at 1502. Any component 1502 in the mobile device can communicate with any other component, although, for ease of illustration, not all connections are shown. The mobile device can be any of a variety of computing devices (e.g., cell phone, smartphone, tablet computer, handheld computer, wearable computing device, HMD device, PDA, and the like) and can allow wireless two-way communications with one or more mobile communication networks 1504, such as a cellular or satellite network.

The illustrated device 110 can include a controller or processor 1510 (e.g., signal processor, microprocessor, microcontroller, ASIC (Application Specific Integrated Circuit), or other control and processing logic circuitry) for performing such tasks as signal coding, data processing, input/output processing, power control, and/or other functions. An operating system 1512 can control the allocation and usage of the components 1502, including power states, above-lock states, and below-lock states, and provides support for one or more application programs 1514. The application programs can include common mobile computing applications (e.g., image-capture applications, email applications, calendars, contact managers, web browsers, messaging applications), or any other computing application.

The illustrated device 110 can include memory 1520. Memory 1520 can include non-removable memory 1522 and/or removable memory 1524. The non-removable memory 1522 can include RAM, ROM, Flash memory, a hard disk, or other well-known memory storage technologies. The removable memory 1524 can include Flash memory or a Subscriber Identity Module (SIM) card, which is well known in GSM (Global System for Mobile communications) systems, or other well-known memory storage technologies, such as "smart cards." The memory 1520 can be used for storing data and/or code for running the operating system 1512 and the application programs 1514. Example data can include web pages, text, images, sound files, video data, or other data sets to be sent to and/or received from one or more network servers or other devices via one or more wired or wireless networks.

The memory 1520 may also be arranged as, or include, one or more computer-readable storage media implemented in any method or technology for storage of information such as computer-readable instructions, data structures, program modules or other data. For example, computer-readable media includes, but is not limited to, RAM, ROM, EPROM, EEPROM, Flash memory or other solid state memory technology, CD-ROM (compact-disc ROM), DVD, (Digital Versatile Disc) HD-DVD (High Definition DVD), Blu-ray, or other optical storage, magnetic cassettes, magnetic tape, magnetic disk storage or other magnetic storage devices, or any other medium which can be used to store the desired information and which can be accessed by the device 110.

The memory 1520 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The device 110 can support one or more input devices 1530, such as a touchscreen 1532; microphone 1534 for implementation of voice input for voice recognition, voice commands and the like; camera 1536; physical keyboard 1538; trackball 1540; and/or proximity sensor 1542; and one or more output devices 1550, such as a speaker 1552 and one or more displays 1554. Other input devices (not shown) using gesture recognition may also be utilized in some cases. Other possible output devices (not shown) can include piezoelectric or haptic output devices. Some devices can serve more than one input/output function. For example, touchscreen 1532 and display 1554 can be combined into a single input/output device.

A wireless modem 1560 can be coupled to an antenna (not shown) and can support two-way communications between the processor 1510 and external devices, as is well understood in the art. The modem 1560 is shown generically and can include a cellular modem for communicating with the mobile communication network 1504 and/or other radio-based modems (e.g., Bluetooth 1564 or Wi-Fi 1562). The wireless modem 1560 is typically configured for communication with one or more cellular networks, such as a GSM network for data and voice communications within a single cellular network, between cellular networks, or between the device and a public switched telephone network (PSTN).

The device can further include at least one input/output port 1580, a power supply 1582, a satellite navigation system receiver 1584, such as a GPS receiver, an accelerometer 1586, a gyroscope (not shown), and/or a physical connector 1590, which can be a USB port, IEEE 1394 (FireWire) port, and/or an RS-232 port. The illustrated components 1502 are not required or all-inclusive, as any components can be deleted and other components can be added.

Figure 16:
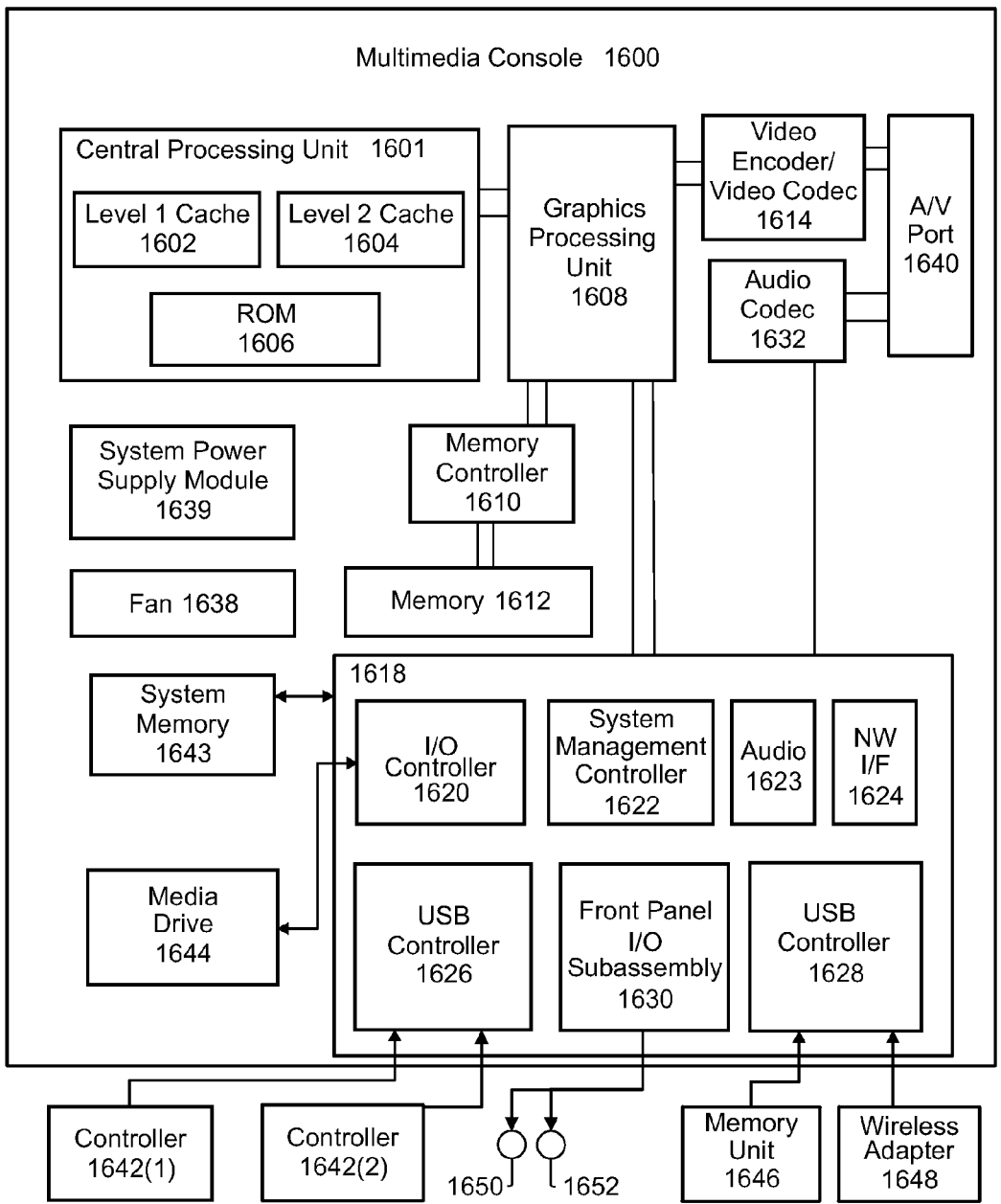
FIG. 16 is a block diagram of an illustrative multimedia console.

FIG. 16 is an illustrative functional block diagram of a multimedia console 1600. The multimedia console 1600 has a central processing unit (CPU) 1601 having a level 1 cache 1602, a level 2 cache 1604, and a Flash ROM (Read Only Memory) 1606. The level 1 cache 1602 and the level 2 cache 1604 temporarily store data and hence reduce the number of memory access cycles, thereby improving processing speed and throughput. The CPU 1601 may be configured with more than one core, and thus, additional level 1 and level 2 caches 1602 and 1604. The Flash ROM 1606 may store executable code that is loaded during an initial phase of a boot process when the multimedia console 1600 is powered ON.

A graphics processing unit (GPU) 1608 and a video encoder/video codec (coder/decoder) 1614 form a video processing pipeline for high speed and high resolution graphics processing. Data is carried from the GPU 1608 to the video encoder/video codec 1614 via a bus. The video processing pipeline outputs data to an A/V (audio/video) port 1640 for transmission to a television or other display. A memory controller 1610 is connected to the GPU 1608 to facilitate processor access to various types of memory 1612, such as, but not limited to, a RAM.

The multimedia console 1600 includes an I/O controller 1620, a system management controller 1622, an audio processing unit 1623, a network interface controller 1624, a first USB (Universal Serial Bus) host controller 1626, a second USB controller 1628, and a front panel I/O subassembly 1630 that are preferably implemented on a module 1618. The USB controllers 1626 and 1628 serve as hosts for peripheral controllers 1642(1) and 1642(2), a wireless adapter 1648, and an external memory device 1646 (e.g., Flash memory, external CD/DVD ROM drive, removable media, and the like). The network interface controller 1624 and/or wireless adapter 1648 provide access to a network (e.g., the Internet, home network, and the like) and may be any of a wide variety of various wired or wireless adapter components including an Ethernet card, a modem, a Bluetooth module, a cable modem, or the like.

System memory 1643 is provided to store application data that is loaded during the boot process. A media drive 1644 is provided and may comprise a DVD/CD drive, hard drive, or other removable media drive. The media drive 1644 may be internal or external to the multimedia console 1600. Application data may be accessed via the media drive 1644 for execution, playback, etc. by the multimedia console 1600. The media drive 1644 is connected to the I/O controller 1620 via a bus, such as a Serial ATA bus or other high speed connection (e.g., IEEE 1394).

The system management controller 1622 provides a variety of service functions related to assuring availability of the multimedia console 1600. The audio processing unit 1623 and an audio codec 1632 form a corresponding audio processing pipeline with high fidelity and stereo processing. Audio data is carried between the audio processing unit 1623 and the audio codec 1632 via a communication link. The audio processing pipeline outputs data to the A/V port 1640 for reproduction by an external audio player or device having audio capabilities.

The front panel I/O subassembly 1630 supports the functionality of the power button 1650 and the eject button 1652, as well as any LEDs (light emitting diodes) or other indicators exposed on the outer surface of the multimedia console 1600. A system power supply module 1639 provides power to the components of the multimedia console 1600. A fan 1638 cools the circuitry within the multimedia console 1600.

The CPU 1601, GPU 1608, memory controller 1610, and various other components within the multimedia console 1600 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, and the like.

When the multimedia console 1600 is powered ON, application data may be loaded from the system memory 1643 into memory 1612 and/or caches 1602 and 1604 and executed on the CPU 1601. The application may present a graphical user interface that provides a consistent user experience when navigating to different media types available on the multimedia console 1600. In operation, applications and/or other media contained within the media drive 1644 may be launched or played from the media drive 1644 to provide additional functionalities to the multimedia console 1600.

The multimedia console 1600 may be operated as a standalone system by simply connecting the system to a television or other display. In this standalone mode, the multimedia console 1600 allows one or more users to interact with the system, watch movies, or listen to music. However, with the integration of broadband connectivity made available through the network interface controller 1624 or the wireless adapter 1648, the multimedia console 1600 may further be operated as a participant in a larger network community.

When the multimedia console 1600 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbps), etc. Because these resources are reserved at system boot time, the reserved resources do not exist from the application's view.

In particular, the memory reservation preferably is large enough to contain the launch kernel, concurrent system applications, and drivers. The CPU reservation is preferably constant such that if the reserved CPU usage is not used by the system applications, an idle thread will consume any unused cycles.

With regard to the GPU reservation, lightweight messages generated by the system applications (e.g., pop-ups) are displayed by using a GPU interrupt to schedule code to render pop-ups into an overlay. The amount of memory needed for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV re-sync is eliminated.

After the multimedia console 1600 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 1601 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 1642(1) and 1642(2)) are shared by gaming applications and system applications. The input devices are not reserved resources, but are to be switched between system applications and the gaming application such that each will have a focus of the device. The application manager preferably controls the switching of input stream, without knowledge of the gaming application's knowledge and a driver maintains state information regarding focus switches.

Various exemplary embodiments of the present contextual search using natural language are now presented by way of illustration and not as an exhaustive list of all embodiments. An example includes a method performed on a device for facilitating a search for content using contextual references, comprising: exposing a user interface supporting natural language inputs for the search from a device user; receiving the natural language inputs from the user through the user interface; parsing the received natural language inputs for contextual references, the contextual references including one of time, date, event, location, schedule, activity, contact, or device; and providing results of the search, the search results identifying content matching one or more of the parsed contextual references.

In another example, the method further includes providing the search results using contextual reference tags. In another example, the method further includes determining a contextual reference tag for a given piece of content and applying the contextual reference tag to the content. In another example, the user interface is supported at least in part by a digital assistant operating on the device. In another example, the digital assistant interacts with the user using a spoken voice over an audio interface supported on the device. In another example the digital assistant interacts with the user over a graphical user interface supported on the device and further including displaying the search results on the graphical user interface. In another example, the method further includes configuring the digital assistant, responsively to voice input, gesture input, or manual input for performing at least one of sharing contact information, sharing a stored contact, scheduling a meeting, looking at a user's calendar, scheduling a reminder, making a call, operating a device, playing games, making purchases, taking notes, scheduling an alarm or wake-up reminder, sending a message, checking social media for updates, scraping a website, interacting with a search service, sharing or showing files, sending a link to a website, or sending a link to a resource. In another example, the content is stored in one or more remote cloud-based stores or cloud-based services. In another example, the method further includes rank ordering the search results according to the contextual references. In another example, the method further includes enabling content identified in the search results to be available for consumption on the device.

A further example includes a device, comprising: one or more processors; a user interface (UI) configured to interact with a user of the device using graphics or audio; and a memory device storing computer-readable instructions which, when executed by the one or more processors, perform a method to: expose a digital assistant on the device in which the digital assistant is configured for voice interactions with a device user using the UI, receive voice inputs from the device user, trigger a search for content using contextual references that are included in the voice inputs, and handle content that is identified in results from the search using the digital assistant.

In another example, the device further comprises displaying search results on the UI as an aggregated list. In another example, the device further comprises using the digital assistant to provide search results using audio. In another example, the digital assistant is configured to use a natural language interface to interact with the user using spoken words. In another example, at least a portion of content includes one or more tags to identify contextual references associated with the portion. In another example, the tags identify one or more of time, date, event, location, schedule, activity, contact, or device.

A further example includes one or more computer-readable memory devices storing instructions which, when executed by one or more processors disposed in a cloud-based computer server, perform a method comprising the steps of: receiving registrations from applications and services running on one or more local devices; monitoring user interactions at the one or more local devices with registered applications and services; and tagging content using contextual reference tags responsively to the monitoring, the contextual reference tags including one or more of time, date, event, location, schedule, activity, contact, or device.

In another example, the one or more computer-readable memory devices further include receiving a search request from a user for content that matches one or more contextual references. In another example, the one or more computer-readable memory devices further include performing a search responsively to the request. In another example, the one or more computer-readable memory devices further include transmitting the search results to one or more of the local devices.

Based on the foregoing, it should be appreciated that technologies for contextual search using natural language have been disclosed herein. Although the subject matter presented herein has been described in language specific to computer structural features, methodological and transformative acts, specific computing machinery, and computer-readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed:

1. A method performed on a device of a plurality of devices associated with a device user for facilitating a search for content using contextual references, comprising:
    monitoring user interactions with the device of the plurality of devices;
    identifying content exposed by the device based on the monitored user interactions;
    using the identified content from the monitored user interactions, determining contextual reference tags for respective pieces of content, the contextual reference tags indicating that the respective pieces of content were exposed on the device of the plurality of devices;
    applying and associating the determined contextual reference tags to the respective pieces of content, the contextual reference tags including an identification of specific devices on which the respective pieces of content were exposed;
    exposing a user interface supporting natural language inputs for the search from the device user;
    receiving the natural language inputs from the device user through the user interface, wherein the natural language inputs include an identification of a device on which the device user accessed content;
    parsing the received natural language inputs for contextual references, the contextual references including the identified device and one or more of time, date, event, location, schedule, activity, or contact;
    performing the search for content using the contextual reference tags and the received contextual references; and
    providing results of the search, the search results identifying content matching at least one or more of the parsed contextual references for the identified device.

2. The method of claim 1 further including providing search results using the contextual reference tags.

3. The method of claim 1 in which the user interface is supported at least in part by a digital assistant operating on the device.

4. The method of claim 3 in which the digital assistant interacts with the user using a spoken voice over an audio interface supported on the device.

5. The method of claim 3 in which the digital assistant interacts with the user over a graphical user interface supported on the device and further including displaying the search results on the graphical user interface.

6. The method of claim 3, further including configuring the digital assistant, responsively to voice input, gesture input, or manual input for performing at least one of sharing contact information, sharing a stored contact, scheduling a meeting, looking at a user's calendar, scheduling a reminder, making a call, operating a device, playing games, making purchases, taking notes, scheduling an alarm or wake-up reminder, sending a message, checking social media for updates, scraping a website, interacting with a search service, sharing or showing files, sending a link to a website, or sending a link to a resource.

7. The method of claim 1 in which the content is stored in one or more remote cloud-based stores or cloud-based services.

8. The method of claim 1 further including rank ordering the search results according to the contextual references.

9. The method of claim 1 further including enabling content identified in the search results to be available for consumption on the device.

10. The method of claim 1 in which the user interactions with the device include consuming media, accessing documents, or browsing the web using a web browser.

11. A device, comprising:
    one or more processors;
    a user interface (UI) configured to interact with a user of the device using graphics or audio; and
    a memory device storing computer-readable instructions which, when executed by the one or more processors, perform a method to:
        monitor user interactions with the device of a plurality of devices;

identify content exposed by the device based on the monitored user interactions;

using the identified content from the monitored user interactions, determine contextual reference tags for respective pieces of content, the contextual reference tags indicating that the respective pieces of content were exposed on the device of the plurality of devices;

apply and associate the determined contextual reference tags to the respective pieces of content, the contextual reference tags including an identification of specific devices on which the respective pieces of content were exposed;

expose a digital assistant on the device in which the digital assistant is configured for voice interactions with the user using the UI, receive voice inputs from the device user, wherein the voice inputs include an identification of a device on which the user accessed content, trigger a search for content using the contextual reference tags and the contextual references that are included in the voice inputs, the contextual references including the identified device, and handle content that is identified in results from the search using the digital assistant.

12. The device of claim 11 further comprising displaying search results on the UI as an aggregated list.

13. The device of claim 11 further comprising using the digital assistant to provide search results using audio.

14. The device of claim 11 in which the digital assistant is configured to use a natural language interface to interact with the user using spoken words.

15. The device of claim 11 in which the contextual reference tags identify one or more of time, date, event, location, schedule, activity, contact, or device.

16. One or more computer-readable memory devices storing instructions which, when executed by one or more processors disposed in a cloud-based computer server, perform a method comprising the steps of:

receiving registrations from applications and services running on a plurality of local devices;

monitoring user interactions at the plurality of local devices with registered applications and services;

identifying content exposed by the plurality of local devices based on the monitored user interactions;

using the identified content from the monitored user interactions, determining contextual reference tags for respective pieces of content; and tagging the identified content with the determined contextual reference tags so that the content is associated with a given contextual reference tag, the contextual reference tags including an identification of a device on which respective pieces of content were accessed and one or more of time, date, event, location, schedule, activity, contact, or device.

17. The one or more computer-readable memory devices of claim 16 further including receiving a search request from a user for content that matches one or more contextual reference tags.

18. The one or more computer-readable memory devices of claim 17 further including performing a search responsively to the request.

19. The one or more computer-readable memory devices of claim 18 further including transmitting the search results to one or more of the local devices.

\* \* \* \* \*